(12) United States Patent
Wei

(10) Patent No.: US 10,470,201 B2
(45) Date of Patent: Nov. 5, 2019

(54) MESSAGE TRANSMITTING METHOD, MESSAGE RECEIVING METHOD AND APPARATUSES THEREOF

(71) Applicant: Beijing Zhigu Rui Tuo Tech Co., Ltd, Beijing (CN)

(72) Inventor: Na Wei, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 139 days.

(21) Appl. No.: 15/197,644

(22) Filed: Jun. 29, 2016

(65) Prior Publication Data
US 2017/0006594 A1 Jan. 5, 2017

(30) Foreign Application Priority Data

Jun. 30, 2015 (CN) .......................... 2015 1 0378190

(51) Int. Cl.
*H04W 72/12* (2009.01)
*H04W 92/18* (2009.01)

(52) U.S. Cl.
CPC ........ *H04W 72/1242* (2013.01); *H04W 92/18* (2013.01)

(58) Field of Classification Search
None
See application file for complete search history.

(56) References Cited

U.S. PATENT DOCUMENTS

| 8,977,227 B2 | 3/2015 | Tiwari |
| 9,584,997 B2 | 2/2017 | Zhou et al. |
| 2009/0274171 A1* | 11/2009 | Lucky ..................... H04L 47/14 370/470 |

(Continued)

FOREIGN PATENT DOCUMENTS

| CN | 101878670 A | 11/2010 |
| CN | 102342162 A | 2/2012 |

(Continued)

OTHER PUBLICATIONS

Varsha H et al. "Enhanced Performance Evaluation for Broadcasting Safety Messages in VANET" (IJCSIT) International Journal of Computer Science and Information Technologies, vol. 5 (2) , 2014, 1595-1598.

(Continued)

*Primary Examiner* — Chirag G Shah
*Assistant Examiner* — Suk Jin Kang
(74) *Attorney, Agent, or Firm* — Amin, Turocy & Watson, LLP

(57) ABSTRACT

A message transmitting method, a message receiving method and apparatuses are provided. A method comprises: according to the size of a message packet to be transmitted, determining a resource used for transmitting the message packet, wherein the resource at least comprises a first priority resource block, and the time interval between respective first priority resource blocks is smaller than that between other priority resource blocks, and transmitting at least a first priority part of the message packet by using the at least one first priority resource block. A relatively frequent resource can be used to transmit a core part of a (vehicle to vehicle) V2V message packet, thus ensuring transmission timeliness and reliability of the V2V message.

32 Claims, 4 Drawing Sheets

(56) References Cited

U.S. PATENT DOCUMENTS

| | | | |
|---|---|---|---|
| 2010/0118796 A1* | 5/2010 | Yi | H04W 72/10 370/329 |
| 2011/0134892 A1 | 6/2011 | Shirakabe et al. | |
| 2012/0134267 A1* | 5/2012 | Noriega | H04W 72/1236 370/230 |
| 2013/0170355 A1* | 7/2013 | Wang | H04L 47/10 370/235.1 |
| 2013/0188576 A1* | 7/2013 | Chao | H04L 47/00 370/329 |
| 2013/0322413 A1* | 12/2013 | Pelletier | H04W 72/1289 370/336 |
| 2014/0185448 A1* | 7/2014 | Wang | H04L 47/10 370/235.1 |
| 2014/0269456 A1* | 9/2014 | Wang | H04B 7/2656 370/280 |
| 2014/0321377 A1* | 10/2014 | Ryu | H04W 72/1247 370/329 |
| 2015/0009910 A1* | 1/2015 | Ryu | H04W 72/04 370/329 |
| 2015/0223217 A1* | 8/2015 | Chen | H04W 72/00 370/329 |
| 2015/0230163 A1* | 8/2015 | Wang | H04L 47/10 455/434 |
| 2015/0327315 A1* | 11/2015 | Xue | H04L 5/0044 370/330 |
| 2015/0365941 A1* | 12/2015 | Liu | H04W 72/0446 370/280 |
| 2016/0143008 A1* | 5/2016 | Lee | H04W 72/042 370/336 |
| 2016/0150520 A1* | 5/2016 | Fodor | H04W 76/14 455/426.1 |
| 2016/0212596 A1* | 7/2016 | Brahmi | H04W 72/0406 |
| 2016/0330011 A1* | 11/2016 | Lee | H04L 5/0066 |
| 2016/0338122 A1* | 11/2016 | Tsai | H04W 8/005 |
| 2016/0345337 A1* | 11/2016 | Seo | H04W 72/082 |
| 2017/0006649 A1* | 1/2017 | Zhao | H04W 28/06 |
| 2017/0048036 A1* | 2/2017 | Tavildar | H04L 1/0025 |
| 2017/0126378 A1* | 5/2017 | Luo | H04L 5/0044 |
| 2017/0188391 A1* | 6/2017 | Rajagopal | H04W 74/0816 |
| 2017/0188404 A1* | 6/2017 | Fodor | H04W 76/023 |
| 2017/0230939 A1* | 8/2017 | Rudolf | H04W 72/04 |
| 2017/0325214 A1* | 11/2017 | Lu | H04W 76/14 |
| 2018/0007625 A1* | 1/2018 | Yu | H04W 72/12 |
| 2018/0042062 A1* | 2/2018 | Matsumoto | H04W 76/14 |
| 2018/0184432 A1* | 6/2018 | Ryoo | H04W 72/0406 |

FOREIGN PATENT DOCUMENTS

| | | |
|---|---|---|
| CN | 102668413 A | 9/2012 |
| CN | 103347246 A | 10/2013 |
| CN | 103428817 A | 12/2013 |

OTHER PUBLICATIONS

Chinese Office Action for Chinese Application Serial No. 201510378190.5 dated Mar. 11, 2019, 5 pages.

* cited by examiner

MESSAGE TRANSMITTING METHOD, MESSAGE RECEIVING METHOD AND APPARATUSES THEREOF

RELATED APPLICATION

The present application claims the benefit of priority to Chinese Patent Application No. 201510378190.5, filed on Jun. 30, 2015, and entitled "MESSAGE TRANSMITTING METHOD, MESSAGE RECEIVING METHOD AND APPARATUSES THEREOF", which application is hereby incorporated herein by reference in its entirety.

TECHNICAL FIELD

Embodiments of the present application relate to the technical field of Internet of Vehicles, and, for example, to a message transmitting method, a message receiving method and apparatuses thereof.

BACKGROUND

With high speed development of mobile device related technologies, people have more and more demands on mobile devices, application scenarios of the mobile devices are more and more complex, and consequently, measuring data (for example, moving speed, position and direction) associated with a mobile terminal can be used for providing more convenience with user. For example, in an on-board scenario, the mobile terminal (a car itself or other devices on-board (called as the mobile terminal in the specification)) can share measuring data, including speed, position, driving direction and breaking when a certain event occurs, for describing the certain event during the car is travelling, with other cars by a V2V (vehicle to vehicle) message through V2V communication, so as to provide a data basis for safe and convenient driving with the user.

Generally, V2V related events (for example, an accident, congestion and the like) mostly occurs suddenly, and have high time requirements, thus transmission of a message packet triggered in response to such events has high requirements on timeliness and reliability. Therefore, a transmission solution capable of ensuring the timeliness and reliability of the V2V message is urgently required.

SUMMARY

Considering this, an example non-limiting objective of one or more embodiments of the present application aims to provide a message transmission solution with higher timeliness and reliability.

For above purpose, in a first aspect, an example embodiment of the present application provides a message transmitting method, comprising:

according to the size of a message packet to be transmitted, determining a resource used for transmitting the message packet, wherein the resource at least comprises at least one first priority resource block, and the time interval between respective first priority resource blocks is smaller than that between respective other priority resource blocks; and transmitting an at least a first priority part of the message packet by using the at least one first priority resource block.

In a second aspect, an example embodiment of the present application provides a message receiving method, comprising:

determining the resource used for transmitting the message packet, wherein the resource at least comprises at least one first priority resource block, wherein the resource at least comprises at least one first priority resource block, and the time interval between respective first priority resource blocks is smaller than that between respective other priority resource blocks; and receiving the message transmitted by using the at least one first priority resource block.

In a third aspect, an example embodiment of the present application provides a message transmitting apparatus, comprising:

a first determining module, configured to according to the size of a message packet to be transmitted, determine a resource used for transmitting the message packet, wherein the resource at least comprises at least one first priority resource block, and the time interval between respective first priority resource blocks is smaller than that between respective other priority resource blocks; and a first transmitting module, configured to transmit an at least a first priority part of the message packet by using the at least one first priority resource block.

In a fourth aspect, an example embodiment of the present application provides a message receiving apparatus, comprising:

a first determining module, configured to determine the resource used for transmitting the message packet, wherein the resource at least comprises at least one first priority resource block, wherein the resource at least comprises at least one first priority resource block, and the time interval between respective first priority resource blocks is smaller than that between respective other priority resource blocks; and a first receiving module, configured to receive the message transmitted by using the at least one first priority resource block.

In a fifth aspect, an example embodiment of the present application provides a computer readable storage device, comprising at least one executable instruction, which, in response to execution, causes a system comprising a processor to perform operations, comprising:

according to the size of a message packet to be transmitted, determining a resource used for transmitting the message packet, wherein the resource at least comprises at least one first priority resource block, wherein the time interval between respective first priority resource blocks is smaller than that between respective other priority resource blocks; and transmitting an at least a first priority part of the message packet by using the at least one first priority resource block.

In a sixth aspect, an example embodiment of the present application provides a message transmitting device comprising a processor and memory, wherein the memory storing a computer executable instruction, the processor being connected with the memory via a communication bus, and when the device is operating, the processor executes or facilitates execution of the executable instructions stored by the memory:

according to the size of a message packet to be transmitted, determining a resource used for transmitting the message packet, wherein the resource at least comprises at least one first priority resource block, wherein the time interval between respective first priority resource blocks is smaller than that between respective other priority resource blocks; and transmitting an at least a first priority part of the message packet by using the at least one first priority resource block.

In a seventh aspect, an example embodiment of the present application provides a computer readable storage device, comprising at least one executable instruction, which, in response to execution, causes a system comprising a processor to perform operations, comprising:

determining the resource used for transmitting a message packet, wherein the resource at least comprises at least one first priority resource block, wherein the resource at least comprises at least one first priority resource block, and the time interval between tow first priority resource blocks is smaller than that between other priority resource blocks; and receiving the message transmitted by using the at least one first priority resource block.

In a eighth aspect, an example embodiment of the present application provides a message receiving device comprising a processor and memory, wherein the memory storing a computer executable instruction, the processor being connected with the memory via a communication bus, and when the device is operating, the processor executes or facilitates execution of the executable instructions stored by the memory:

determining the resource used for transmitting a message packet, wherein the resource at least comprises at least one first priority resource block, wherein the resource at least comprises at least one first priority resource block, and the time interval between tow first priority resource blocks is smaller than that between other priority resource blocks; and receiving the message transmitted by using the at least one first priority resource block.

The methods and apparatuses of example embodiments of the present application use a relatively frequent resource to transmit a core part of a V2V message packet, thus ensuring transmission timeliness and reliability of the V2V message.

DETAILED DESCRIPTION

Figure 1:
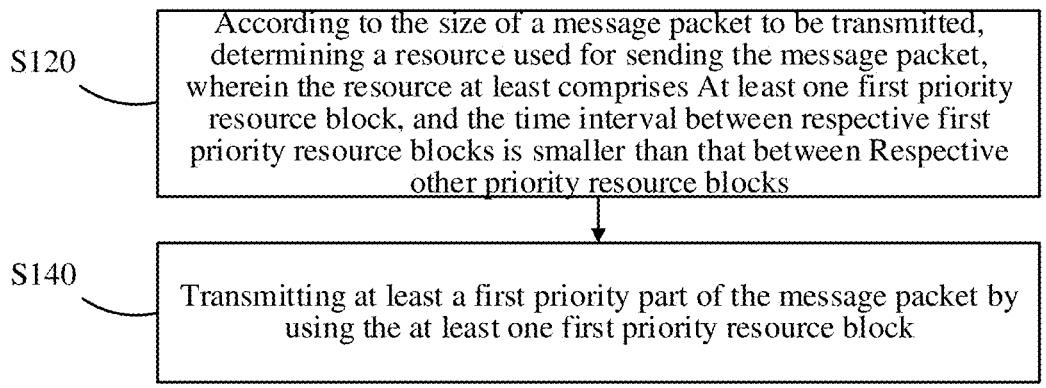
FIG. 1 is a flowchart of an example of a message transmitting method according to an embodiment of the present application.

Example embodiments of the present application are further described below in detail with reference to the accompanying drawings (in which like elements are denoted by like reference numerals) and description. The example embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any necessary logical relationship between the terms.

In order to better understand example embodiments of the present application, terms used in the example embodiments of the present application are explained as follows. In the example embodiments of the present application, each node device in a V2V communication network can comprise: a user equipment capable of moving per se, or movable by carried by a movable platform (for example, a car or other vehicle) and having a signal transceiving function, such device including any terminal device, for example a cellphone, a wearable device, a PC, a car and any other on-board devices. A message packet to be transmitted refers to any message packet triggered by the same event and including any information for describing the event. In a V2V scene, the information for describing the event comprises any measuring data acquirable by nodes device, for example, a moving speed, position, direction, breaking state, moving track, road condition etc., of the node device. According to the technical solutions of embodiments of the present application, according to the importance of the measuring data for describing the triggered event, the message packet to be transmitted is divided into a core message packet and a non-core message packet. The information in the core message packet is a part enough to describe the event condition that requires to be known by other node devices most in the information to be transmitted, for example, a GPS position, a moving speed, etc, and a first priority part used in the description of the technical solutions of embodiments of the present application, at least should contains the content of the core message packet. The information in the non-core message packet may comprise other measuring data for example, a moving track, a road condition etc., that is not so important in knowing the triggered event, and the non-core message packet should be at least all or partially contained in a second priority part in the description of the technical solutions of respective embodiments of the present application. For ensuring transmitting timeliness and reliability of the V2V message, the core message packet that is the first priority part should be sent more frequently. Based on above description, in the technical solutions of the embodiments of the present application, in a resource for transmitting the V2V message, at least a higher priority resource was pre-allocated for transmitting a first priority part of the V2V message, such higher priority resource is called as a first priority resource block in the description of the technical solutions of embodiments of the present application, and the time interval between two adjacent first priority resource blocks is smaller than the that between two adjacent other priority resource blocks, in other words, the first resource block is the resource which may be resources used more frequently used than other priority resources in terms of timing, thereby ensuring the timeliness and reliability of the V2V message. In the technical solutions of embodiments of the present application, the core message packet may be of a fixed size, so that the node device as a message receiving party can demodulate the core part faster and more accurately, to make a fast response. The fixed size may be preset, for example, defined in the standard specification associated with the physical layer. It should be noted that the resource available for transmitting the V2V message may be shared resource allocated for D2D communication by a base station, or maybe dedicated resource allocated for V2V message transmitting by a base station.

FIG. 1 is a flowchart of a message transmitting method according to an example embodiment of the present application, and the method can be executed by any node device needing to transmit measuring data. As shown in FIG. 1, the method comprises:

S120: according to the size of a message packet to be transmitted, determining a resource used for transmitting the message packet, wherein the resource at least comprises at least one first priority resource block, and the time interval between respective first priority resource blocks is smaller than that between respective other priority resource blocks.

In the method of the present embodiment, according to different events triggering the transmitting of the V2V messages, and/or the different sizes of the information (measuring data) describing the event usable in transmitting, the message packet to be transmitted may have different sizes. The determining in step S102 comprises: according to the size of the message packet to be transmitted, determining to use a first priority resource block to transmit at least a first priority part including a core message packet. Additionally, the first priority resource block is such kind of the resource that maybe known resource able to be shared between multiple node devices for transmitting the first priority part, the determining in the step S102 further comprises: determining specific resource to be used through competition mechanism to such resource.

Figure 2:
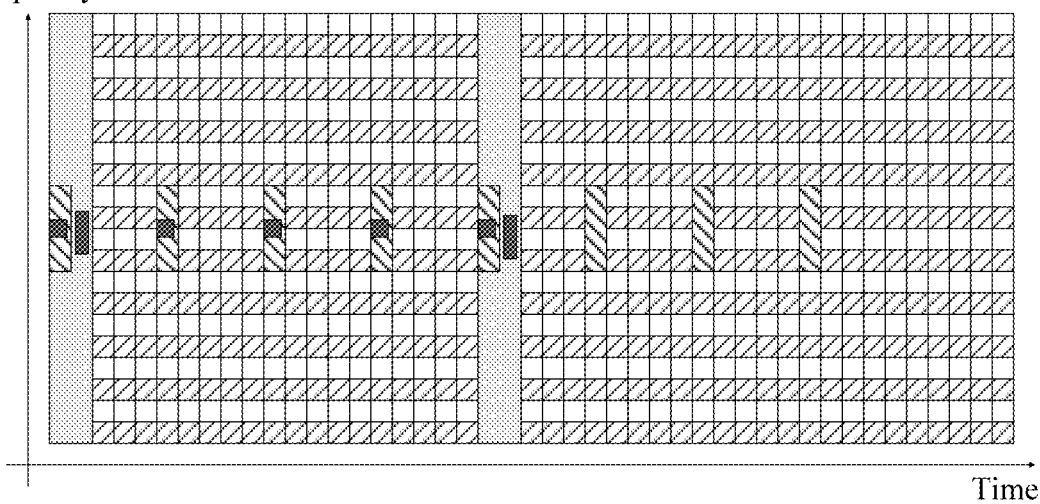
FIG. 2 is a schematic diagram of an example of a resource used in an embodiment of the present application.

FIG. 2 is a schematic diagram of an example of a resource can be used in transmitting the V2V message packet by the node device, the resource is shown to have a two dimensional structure of time and frequency, as shown in FIG. 2, in the method of the present embodiment, the resource for transmitting the V2V message packet comprises at least one first priority resource block, the first priority resource blocks available and the second priority resource blocks are indicated by right inclined line squares and latticed squares in FIG. 2, respectively, although there are two priorities shown, there may be another numbers of priorities, the time interval between the respective first priority resource blocks in FIG. 2 is smaller than that between other priority resource blocks (for example, the second priority resource block), in other words, the first priority resource blocks may be used more frequently than other priority resource blocks in terms of timing. It should be noted that the time interval between the respective first priority resource blocks can be predetermined to meeting the requirements on the absolute delay associated with the V2V message and the requirements one the absolute delay may be different depending on different events.

S140: transmitting at least the first priority part of the message packet by using the at least one first priority resource block.

According to the resource determined in step S120, in step S140, transmitting at least the priority part of the message packet by using the at least one first priority resource block, thereby causing the core message in the V2V message to be transmitted more frequently.

The method of the embodiment of the present application may be able to ensure transmission timeliness and reliability of the V2V message by using a relatively frequent resource to transmit a core part of a V2V message packet.

In one example embodiment, a preset threshold value can be set for dividing the message to be transmitted by the resource with different priorities, the preset threshold value should be such a value that at least the V2V core message packet can be included in a packet of the present threshold value size, taking in to the size of the data packet which can be carried over a unit resource for V2V message transmitting defined for physical layer accounted, the preset threshold value should be set to a value not smaller than the size of the core message packet. The message packet of a size not smaller than the preset threshold value is to be divided, the part containing the core message packet is used as the first priority part and transmitted by using the higher priority resource blocks, and the second priority part containing at least part of the non-core message packet is transmitted by using the lower priority resource blocks. Specifically, the step S120 can further comprise:

S122: determining to use the at least one first priority resource block to transmit the message packet in response to that the size of the message packet is not larger than the preset threshold value.

For example, the preset threshold value is 58 bytes which is almost the size of the message the air interface resources of 2 physical resource blocks (PRB) capable to transmit, the node device may has an event which would trigger the transmitting of a CLW type message, the size of the message packet to be transmitted for describing such event is only 50 bytes containing a CLW indication and a GPS position of the node device, which is below the preset threshold value. At this point, the whole message packet can be transmitted by directly using the higher priority (first priority) resource block.

In a case that the resource comprising at least one second resource block, the step S102 can further comprise:

S124: determining to use the at least one first priority resource block to transmit the first priority part, and to use the at least one second priority resource block to transmit the at least one second priority part of the message packet in response to that the size of the message packet is larger than the preset threshold value.

For example, the preset threshold value is 58 bytes, the node device has an event which would trigger the transmitting of a CLW type message, the size of the message packet to be transmitted for describing the event is 1000 bytes and containing a CLW indication and a GPOS position of the node device, a car speed, a direction, a predicted track, a road lane, etc., which is above the preset threshold value. At this point, the message packet to be transmitted can be divided into two parts, one part is transmitted by the high priority resource as described in regard to the size and content in step S122, and the rest part is transmitted by the low priority resource.

Furthermore, in the method of the present embodiment, the size of the first priority part may be fixed but is relatively smaller, and the size of the second priority part may be changeable and is relatively larger. Thus, a receiving party may be able to demodulate the first priority part faster and more accurately, thereby making a fast response. The first priority part has a higher timeliness requirement, and smaller packets may occupy less resource of the system. On the other hand, the receiving party with conditions and time can continuously receive the second priority part rapidly and further knows the details of the V2V message.

In addition, in order to cause the node device of the message receiving party to fast obtain the non-core message packet as needed, in one example embodiment, there is a preset corresponding relation between the position of the resource for transmitting the first priority part within the first priority resource block and the position of the resource for transmitting the second priority part within the at least one second priority resource block. The corresponding relation is known to the devices of the message receiving party and the message transmitting party, for example, negotiated by the two in advance. In such complementation manner, the step S120 further comprises:

S123: at least according to the position of the resource for transmitting the first priority part within the first priority resource block, determining the position of the resource for transmitting the second priority part within the at least one second priority resource block. The corresponding relation can be in following manners: a resource index of the resource of the second priority resource block for transmitting the second priority part is a function of a resource index of the resource of the first priority resource block for transmitting the second priority part, for example, as shown in FIG. 2, the resource (indicated by black-filled squares as shown) corresponding to an index 7 of the first priority resource block is used for transmitting the first priority part, thereby it can be determined that the resource (indicated by rectangle-filled squares in the drawing) corresponding to the index 7 of the second priority resource block is used for transmitting rest parts of the message packet.

In another example embodiment, the corresponding relation can be contained in the message packet and transmitted along with the packet, then received and parsed by the device of the message receiving party. In such an example embodiment, in the step S122, transmitting the first priority part and indicating information associated with the second priority part by using the at least one first priority resource block. The indicating information may comprise the associated information of the corresponding relation, for example, it may contain the information associated with that the resource index of the resource for transmitting the second priority part within the second priority resource block is a function of a resource index of the resource for transmitting the second priority part within the first priority resource block.

In addition, the indicating information may comprise information indicating whether a non-core part (second priority part) exists, for example, one or more bits maybe set to indicate whether a corresponding non-core message packet (indicator 0 or 1) and other feature information associated with the non-core packet are contained, to help the node device of the receiving party to judge whether to receive the non-core packet and how to receive the non-core packet, such as the size of the second priority part, and/or the time interval between the respective priority resource blocks.

It should be further indicated that, as above mentioned, the resource for transmitting the V2V message in the method of the present embodiment may be shared resource allocated for D2D by a base station, the node device of the message transmitting party may compete for one or more of the at least one first priority block, and/or for one or more of the at least one second priority block from the shared resource. The resource for transmitting the V2V message may be dedicated resource allocated for the V2V communication by a base station, the node device of the message transmitting party can compete for one or more of the at least one first priority block, and/or for one or more of the at least one second priority block from the dedicated resource.

The method of the present embodiment can meet the timeliness and reliability requirements of the V2V message, while it is favorable for the receiving party to more effectively receive the V2V message packet.

The present application further provides a message receiving method, and the message receiving method can be executed by any node device needing to receive measuring data. As shown in FIG. 1, the method comprises:

S320: determining a resource used for transmitting the message packet, wherein the resource at least comprises at least one first priority resource block, and the time interval between respective first priority resource blocks is smaller than that between other priority resource blocks.

In combination with the description in FIG. 1, the first priority block is used for transmitting at least a first priority part of the message packet to be transmitted, the first priority resource block is the resource known to each node device for transmitting the first priority part, and each node device as transmitting party can compete for the resource to use. The determining in the step S320 comprises determining at least one first priority resource block on which a message packet is received.

S340: receiving a message transmitted by using the at least one first priority resource block, thereby realizing receiving of the V2V message packet with higher timeliness.

In one example embodiment, the transmitting and receiving parties of the v2V message have known a dividing strategy of the message packet, for example, divided to two parts, a first priority part of a fixed size and a second priority part of a changeable size, that is, the resource further comprises at least one second priority resource block, the node device of the receiving party knows that the transmitting of the message packet is realized by using two kinds of priority resource blocks, and in such example embodiment, the method further comprises:

S360: receiving the message transmitted by using the at least one second priority resource block.

In addition, in order to cause the node device of the message receiving party to fast obtain the lower priority part, in one example embodiment, there may a preset corresponding relation between the position of the resource for transmitting the first priority part within the first priority resource block and the position of the resource for transmitting the second priority part within the at least one second priority resource block. The corresponding relation is known to the node devices of the message receiving party and the message transmitting party, for example, negotiated by the two in advance. In such an example embodiment, the step S320 further comprises:

S362: at least according to the position of the resource within the first priority resource block for transmitting the first priority part, determining the position of the resource within the at least one second priority resource block for transmitting the second priority part. The corresponding relation can be in following manners: a resource index of the resource of the second priority resource block for transmitting the second priority part is a function of a resource index of the resource of the first priority resource block for transmitting the second priority part, for example, as shown in FIG. 2, the resource (indicated by black-filled squares in the drawing) corresponding to an index 7 of the first priority resource block is used for transmitting the first priority part, thereby it can be determined that the resource (indicated by rectangle-filled squares in the drawing) corresponding to the index 7 of the second priority resource block is used for transmitting rest parts of the message packet.

In another example embodiment, the corresponding relation can be contained in the message packet and transmitted along with the packet, then received and parsed by the device of the message receiving party. In such an example embodiment, in the step S340, the information received on the at least one first priority resource block further comprises indicating information related to the second priority part. The indicating information may comprise the associated information of the corresponding relation, for example, it may contain the information associated with that the resource index of the resource of the second priority resource block for transmitting the second priority part is a function of a resource index of the resource within the first priority resource block for transmitting the second priority part.

In addition, the indicating information may comprise information for indicating whether a non-core part (second priority part) exists, for example, one or more bits maybe set to indicate whether a corresponding non-core message packet (indicator 0 or 1) and other feature information associated with the non-core packet are contained, to help the node device of the receiving party to judge whether to receive the non-core packet and how to receive the non-core packet, such as the size of the second priority part, and/or the time interval between the respective priority resource blocks.

It should be understood by those skilled in the art that, in any one of the foregoing methods of the example embodiments of the present application, the value of the serial number of each step described above does not mean an execution sequence, and the execution sequence of each step should be determined according to the function and internal logic thereof, and should not be any limitation to the implementation procedure of the example embodiments of the present application.

In addition, an embodiment of the present application further provides a computer readable medium, comprising a computer readable command executed to perform following operations: operations of respective steps of the method in the embodiment as shown in FIG. 1.

Figure 3:
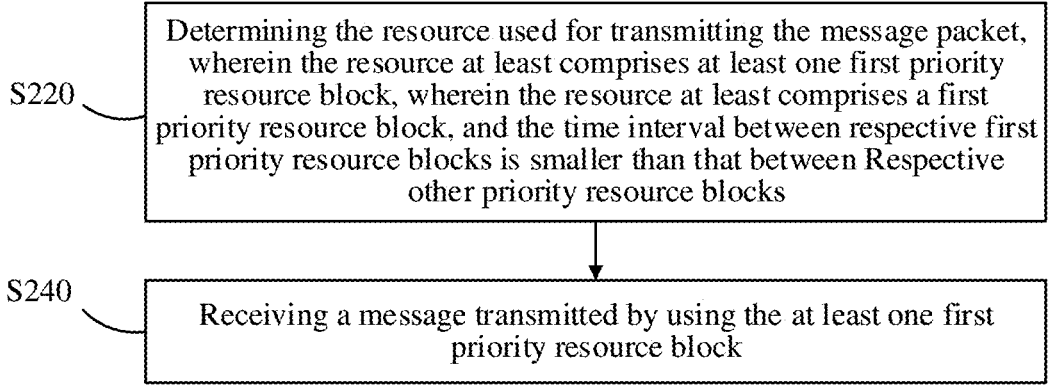
FIG. 3 is a flowchart of an example of a message receiving method according to an embodiment of the present application.

In addition, an embodiment of the present application further provides a computer readable medium, comprising a computer readable command executed to perform following operations: operations of respective steps of the method in the embodiment as shown in FIG. 3.

Figure 4:
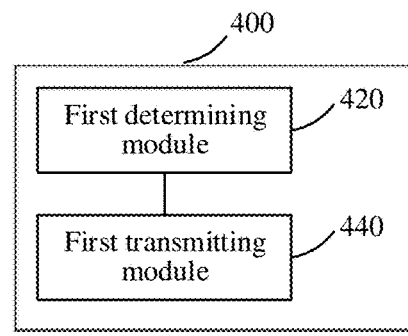
FIG. 4 is a structural schematic diagram of an example of a message transmitting apparatus according to an embodiment of the present application.

An embodiment of the present application further provides a message transmitting apparatus for executing the message transmitting method, and the apparatus belongs to any node device. Besides respective constitution parts described below, the apparatus can further comprise a communication module capable of communicating with any external device as required. As shown in FIG. 4, the message transmitting apparatus 400 according to the embodiment of the present application comprises:

a first determining module 420, configured to according to the size of a message packet to be transmitted, determine a resource used for transmitting the message packet, wherein the resource at least comprises at least one first priority resource block, and the time interval between respective first priority resource blocks is smaller than that between respective other priority resource blocks.

In the apparatus of the present embodiment, according to different events triggering the transmitting of the V2V messages, and/or the different size of the information (measuring data) describing the event usable in transmitting, the message packet to be transmitted may have different sizes. The first determining module 420 is configured to according to the size of the message data packet to be transmitted, determine to use a first priority resource block to transmit at least a first priority part including a core message packet. In addition, the first priority resource block is such kind of the resource that maybe known resource able to be shared between multiple node devices for transmitting the first priority part, the first determining module 420 is configured to determine a specific resource to be used through competition mechanism to such resource.

FIG. 2 is a schematic diagram of an example of a resource can be used in transmitting the V2V message packet by the node device, the resource is shown to have a two dimensional structure of time and frequency, as shown in FIG. 2, in the method of the present embodiment, the resource for transmitting the V2V message packet comprises at least one first priority resource block, the first priority resource blocks available and the second priority resource blocks are indicated by right inclined line squares and latticed squares in FIG. 2, respectively, although there are two priorities shown, there may be another numbers of priorities, the time interval between the respective first priority resource blocks in FIG. 2 is smaller than that between other priority resource blocks (for example, the second priority resource block), in other words, the first priority resource blocks maybe used more frequently than other priority resource blocks in terms of timing. It should be noted that the time interval between the respective first priority resource blocks can be predetermined meeting the requirements on the absolute delay associated with the V2V message and the requirements one the absolute delay may be different depending on different events. In one example embodiment, the first priority resource block is a known shared resource to a plurality of node devices for transmitting the core message, and the first determining module 420 is further configured to determine specific resource on the resource through competition mechanism.

A first transmitting module 440, configured to transmit an at least one a first priority part of the message packet by using the at least one first priority resource block.

According to the resource determined by the first determining module 420, the first transmitting module 440 transmits at least a first priority part of the message packet by using the at least one first priority resource block, thereby causing the core message in the V2V message to be more transmitted frequently.

The method of the embodiment of the present application may be able to ensure transmission timeliness and reliability of the V2V message by using a relatively frequent resource to transmit a core part of a V2V message packet.

In one example embodiment, a preset threshold value can be set for dividing the message to be transmitted by the resource with different priorities, the preset threshold value should be such a value that at least the V2V core message packet can be included in a packet of the present threshold value size, taking in to the size of the data packet which can be carried over a unit resource for V2V message transmitting defined for physical layer accounted, the preset threshold value should be set to a value not smaller than the size of the core message packet. The message packet of a size not smaller than the preset threshold value is to be divided, the part containing the core message packet is used as the first priority part and is transmitted by using the higher priority resource blocks, and the second priority part containing at least part of the non-core message packet is sent by using the lower priority resource blocks. Specifically, the first determining module 420 is further configured to determine to use the at least one first priority resource block to transmit the message packet in response to that the size of the message packet is not larger than the preset threshold value.

For example, the preset threshold value is 58 bytes which is almost the size of the message the air interface resources of 2 physical resource blocks (PRB) capable to transmit, the node device may has an event which would trigger the transmitting of a CLW type message, the size of the message packet to be transmitted for describing such event is only 50 bytes containing a CLW indication and a GPOS position of the node device, which is below the preset threshold value. At this point, the whole message packet can be transmitted by directly using the higher priority (first priority) resource block.

In a case that the resource at least comprising at least one second resource block, the first determining module 420 is further configured to determine to use the at least one first priority resource block to transmit the first priority part, and to use the at least one second priority resource block to transmit the at least one second priority part of the message packet in response to a fact that the size of the message packet is larger than the preset threshold value.

For example, the preset threshold value is 58 bytes, the node device has which would trigger the transmitting of a CLW type message, the size of the message packet to be transmitted for describing the event is 1000 bytes containing a CLW indication and a GPOS position of the node device, a car speed, a direction, a predicted track, a road lane, etc., which is above the preset threshold value. At this point, the message packet to be transmitted can be divided into two parts, one part is transmitted by the high priority resource as described in regard to the size and content described in step S122, and the rest part is transmitted by the low priority resource.

In addition, in the apparatus of the present embodiment, the size of the first priority part may be fixed but is relatively smaller, and the size of the second priority part maybe changeable and is relatively larger. Thus, a receiving party may be able to demodulate the first priority part faster and more accurately, thereby making a fast response. The first priority part has a higher timeliness requirement, and smaller packets may occupy less resource of the system. On the other hand, the receiving party with conditions and time can continuously receive the second priority part rapidly and further knows the details of the V2V message.

In addition, in order to cause the node device of the message receiving party to fast obtain the non-core message packet as needed, in one example embodiment, there is a preset corresponding relation between the position of the resource of the first priority resource block for transmitting the first priority part within the first priority resource block and the position of the resource for transmitting the second priority part within the at least one second priority resource block. The corresponding relation is known to the devices of the message receiving party and the message transmitting party, for example, negotiated by the two in advance. In such an example embodiment, the first determining module 420 is further configured to: at least according to the position of the resource for transmitting the first priority part within the first priority resource block, determine the position of the resource for transmitting the second priority part within the at least one second priority resource block. The corresponding relation can be in following manners: a resource index of the resource of the second priority resource block for transmitting the second priority part is a function of a resource index of the resource of the first priority resource block for transmitting the second priority part, for example, as shown in FIG. 2, the resource (indicated by black-filled squares as shown) corresponding to an index 7 of the first priority resource block is used for transmitting the first priority part, thereby it can be determined that the resource (indicated by rectangle-filled squares in the drawing) corresponding to the index 7 of the second priority resource block is used for transmitting rest parts of the message packet.

In another example embodiment, the corresponding relation can be contained in the message packet and transmitted along with the packet, then received and parsed by the device of the message receiving party. In such an example embodiment, the first determining module 420 uses the at least one first priority resource block to transmit the first priority part and indicating information associated with the second priority part. The indicating information may comprise the associated information of the corresponding relation, for example, it may contain the information associated with that the resource index of the resource for transmitting the second priority part within the second priority resource block is a function of a resource index of the resource for transmitting the second priority part within the first priority resource block.

In addition, the indicating information may comprise information for indicating whether a non-core part (second priority part) exists, for example, one or more bits may be set to indicate whether a corresponding non-core message packet (indicator 0 or 1) and other feature information associated with the non-core packet are contained, to help the node device of the receiving party to judge whether to receive the non-core packet and how to receive the non-core packet, such as the size of the second priority part, and/or the time interval between the respective priority resource blocks.

It should be further indicated that, as abovementioned, the resource for transmitting the V2V message in the method of the present embodiment may be shared resource allocated for D2D by a base station, the node device of the message transmitting party may compete for one or more of the at least one first priority block, and/or for one or more of the at least one second priority block from the shared resource. The resource for transmitting the V2V message may be dedicated resource allocated for the V2V communication by a base station, the node device of the message transmitting party can compete for one or more of the at least one first priority block, and/or for one or more of the at least one second priority block from the dedicated resource.

The apparatus of the present embodiment can meet the timeliness and reliability requirements of the V2V message, while it is favorable for the receiving party to more effectively receive the V2V message packet.

Figure 5A:
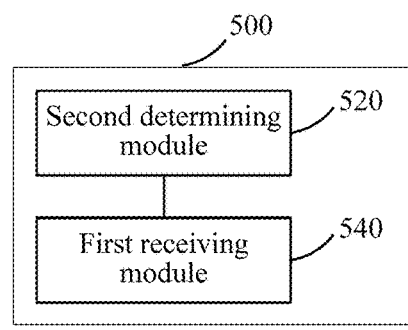
FIG. 5(a) to FIG. 5(b) are structural schematic diagrams of a plurality of examples of a message receiving apparatus according to an embodiment of the present application.
Figure 5B:
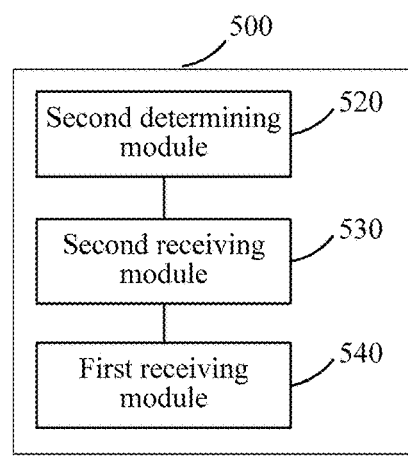

An embodiment of the present application further provides a message receiving apparatus for executing the message receiving method, and the apparatus belongs to any node device. Besides respective constitution parts described below, the apparatus can further comprise a communication module capable of communicating with any external device as required. As shown in FIG. 5, the message receiving apparatus 500 according to the embodiment of the present application comprises:

a first determining module 520, configured to determine a resource used for transmitting the message packet, wherein the resource at least comprises at least one first priority resource block, wherein the resource at least comprises a first priority resource block, and the time interval between respective first priority resource blocks is smaller than that between other priority resource blocks.

In combination with the description in FIG. 1, the first priority block is used for transmitting at least a first priority part of the message packet to be transmitted, the first priority resource block is the resource known to each node device for transmitting the first priority part, and each node device as transmitting party can compete for the resource to use. The second determining module 520 is configured to determine at least one first priority resource block on which a message packet is received.

A first receiving module 540, configured to receive a message transmitted by using the at least one first priority resource block.

In one example embodiment, the transmitting and receiving parties of the v2V message have known a dividing strategy of the message packet, for example, divided to two parts, a first priority part of a fixed size and a second priority part of a changeable size, that is, the resource further comprises at least one second priority resource block, the node device of the receiving party knows that the transmitting of the message packet is realized by using two kinds of priority resource blocks, and in such example embodiment, as shown in FIG. 5, the apparatus 500 further comprises:

a second receiving module 530, configured to receive the message transmitted by using the at least one second priority resource block.

In addition, in order to cause the node device of the message receiving party to fast obtain the lower priority part, in one example embodiment, there may a preset corresponding relation between the position of the resource for transmitting the first priority part within the first priority resource block and the position of the resource for transmitting the second priority part within the at least one second priority resource block. The corresponding relation is known to the node devices of the message receiving party and the message transmitting party, for example, negotiated by the two in advance. In such an example embodiment, the second receiving module 530 is further configured to: at least according to the position of the resource of the first priority resource block for transmitting the first priority part, determine a position within the resource of the at least one second priority resource block for transmitting the second priority part. The corresponding relation can be in following manners: a resource index of the resource of the second priority resource block for transmitting the second priority part is a function of a resource index of the resource of the first priority resource block for transmitting the second priority part, for example, as shown in FIG. 2, the resource (indicated by black-filled squares in the drawing) corresponding to an index 7 of the first priority resource block is used for transmitting the first priority part, thereby it can be determined that the resource (indicated by rectangle-filled squares in the drawing) corresponding to the index 7 of the second priority resource block is used for transmitting rest parts of the message packet.

In another example embodiment, the corresponding relation can be contained in the message packet and transmitted along with the packet, then received and parsed by the device of the message receiving party. In such an example embodiment, for the second receiving module 530, the information received on the at least one first priority resource block further may comprise indicating information related to the second priority part. The indicating information can comprise the associated information of the corresponding relation, for example, it may contain the information associated with that the resource index of the resource of the second priority resource block for transmitting the second priority part is a function of a resource index of the resource within the first priority resource block for transmitting the second priority part.

In addition, the indicating information may comprise information for indicating whether a non-core part (second priority part) exists, for example, one or more bits may be set to indicate whether a corresponding non-core message packet (indicating 0 or 1) and other feature information associated with the non-core packet are contained, to help the node device of the receiving party to judge whether to receive the non-core packet and how to receive the non-core packet, such as the size of the second priority part, and/or the time interval between the respective priority resource blocks.

Figure 6:
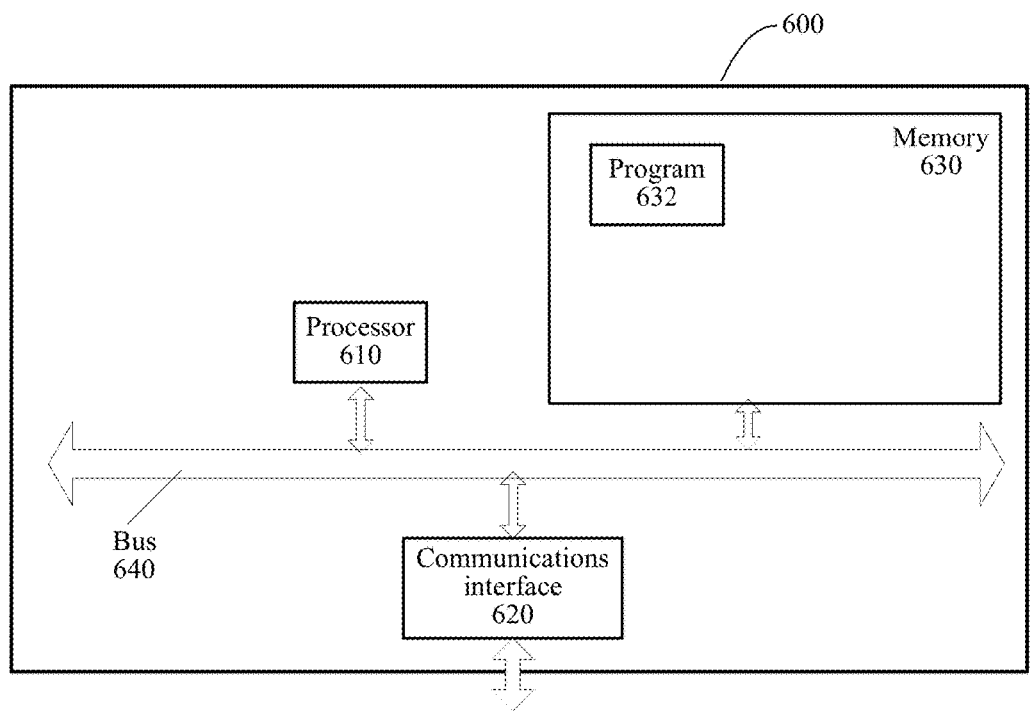
FIG. 6 is a structural schematic diagram of another example of a message transmitting apparatus according to an embodiment of the present application.

FIG. 6 is a schematic structural diagram of a message transmitting apparatus 600 according to an embodiment of the present application; the specific embodiment of the present application does not limit implementation of the message transmitting apparatus 600. As shown in FIG. 6, the message transmitting apparatus 600 may comprise:

a processor 610, a communications interface 620, a memory 630, and a communications bus 640.

The processor 610, the communications interface 620, and the memory 630 communicate with each other via the communications bus 640.

The communications interface 620 is configured to communicate with, for example, a network element such as a client.

The processor 610 is configured to run a program 632, and specifically can realize related functions of the message transmitting apparatus in the apparatus embodiment in FIG. 4.

For example, the program 632 may comprise a program code, wherein the program code comprises a computer operating instruction.

The processor 610 may be a central processing unit (CPU), or an application specific integrated circuit (ASIC), or one or more integrated circuits configured to implement the embodiments of the present application. The program 632 can be specifically configured to cause the message transmitting apparatus 600 to perform the following operations of:

according to the size of a message packet to be transmitted, determining a resource used for transmitting the message packet, wherein the resource at least comprises at least one first priority resource block, and the time interval between respective first priority resource blocks is smaller than that between other respective priority resource blocks; and transmitting at least a first priority part of the message packet by using the at least one first priority resource block.

The steps in the program 632 refer to the corresponding descriptions of corresponding steps and units in the foregoing embodiments, which are not repeated herein. It may be clearly understood by a person skilled in the art that, for the purpose of convenient and brief description, reference may be made to the description of corresponding procedures in the foregoing method embodiments for detailed working procedures of the foregoing devices and modules, and details are not repeated herein.

Figure 7:
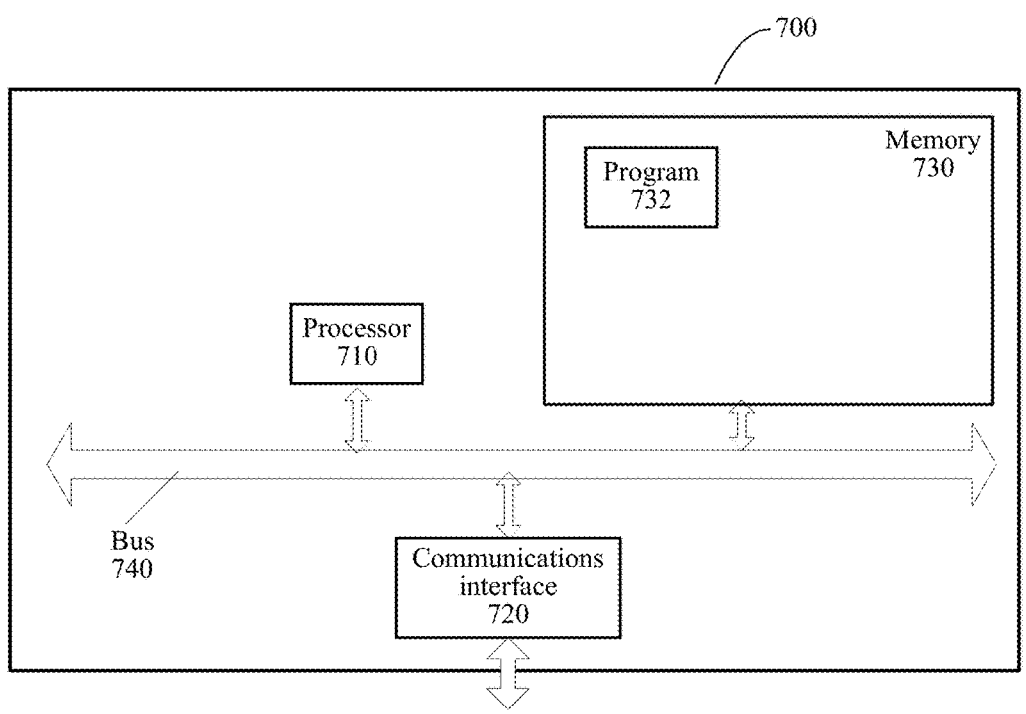
FIG. 7 is a structural schematic diagram of another example of a message receiving apparatus according to an embodiment of the present application.

FIG. 7 is a schematic structural diagram of a message receiving apparatus 700 according to an embodiment of the present application; the specific embodiment of the present application does not limit an implementation of the message receiving apparatus 700. As shown in FIG. 7, the message transmitting apparatus 700 may comprise:

a processor 710, a communications interface 720, a memory 730, and a communications bus 740.

The processor 710, the communications interface 720, and the memory 730 communicate with each other via the communications bus 740.

The communications interface 720 is configured to communicate with, for example, a network element such as a client.

The processor 710 is configured to run a program 732, and specifically perform related steps in the method embodiment.

Specifically, the program 732 may comprise a program code, wherein the program code comprises a computer operating instruction.

The processor 710 can be a CPU or an ASIC (Application Specific Integrated Circuit), or is configured to be one or more integrated circuits to execute the embodiments of the present application.

The memory 730 is configured to store the program 732. The memory 730 possibly contains a high speed Ram memory and possibly further comprises a non-volatile memory, for example, at least one disk memory. The program 732 is specifically configured to enable the message receiving apparatus 700 to execute following steps:

determining the resource used for transmitting the message packet, wherein the resource at least comprises at least one first priority resource block, wherein the resource at least comprises at least one first priority resource block, and the time interval between respective first priority resource blocks is smaller than that between respective other priority resource blocks; and receiving the message sent transmitted by using the at least one first priority resource block.

The steps in the program 732 refer to the corresponding descriptions of corresponding steps and units in the foregoing embodiments, which are not repeated herein. It may be clearly understood by a person skilled in the art that, for the purpose of convenient and brief description, reference may be made to the description of corresponding procedures in the foregoing method embodiments for detailed working procedures of the foregoing devices and modules, and details are not repeated herein.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multi-processor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above example embodiments are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
   determining, by a system comprising a processor, a resource to be used for transmitting a message packet based on a size of the message packet to be transmitted, wherein the resource comprises at least one primary priority resource block, and wherein a first time interval between a first primary priority resource block of the at least one primary priority resource block and a second primary priority resource block of the at least one primary priority resource block is smaller than a second time interval between a first secondary priority resource block and a second secondary priority resource block of at least one secondary priority resource block, and wherein the at least one primary priority resource block has a different priority than the at least one secondary priority resource block; and
   transmitting, by the system, at least a first priority part of the message packet by using the at least one primary priority resource block,
   wherein the determining the resource to be used for the transmitting of the message packet comprises:
      determining the at least one primary priority resource block to transmit at least the first priority part,
      determining the first secondary priority resource block to transmit at least a second priority part of the message packet in response to determining that the size of the message packet is larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer, and at least according to a first position of the at least one primary priority resource block for transmitting at least the first priority part within the resource, determining a second position of the first secondary priority resource block for transmitting at least the second priority part within the resource.

2. The method of claim 1, wherein the determining the resource to be used for the transmitting of the message packet comprises determining the at least one primary priority resource block in response to determining that the size of the message packet is not larger than the preset threshold value.

3. The method of claim 1, wherein a second resource index of the first secondary priority resource block for transmitting at least the second priority part is a function of a first resource index of the primary priority resource block for transmitting at least the first priority part.

4. The method of claim 1, wherein a size of the first priority part is not larger than another size of the second priority part.

5. The method of claim 1, wherein a size of the first priority part is fixed.

6. The method of claim 1, further comprising:
using the at least one primary priority resource block to transmit at least the first priority part and indicating information associated with at least the second priority part.

7. The method of claim 6, wherein the indicating information comprises:
a second resource index of the resource corresponding to the first secondary priority resource block for transmitting at least the second priority part is a function of a first resource index of the resource corresponding to the at least one first priority resource block for transmitting at least the first priority part.

8. The method of claim 6, wherein the indicating information indicates a size of the secondary priority part or a value of the first time interval.

9. The method of claim 1, wherein the at least one primary priority resource block belongs to a shared resource for a device-to-device communication between devices or belongs to a dedicated resource for a vehicle-to-vehicle communication.

10. The method of claim 1, wherein the first secondary priority resource block belongs to a shared resource for a device-to-device communication between devices or belongs to a dedicated resource for a vehicle-to-vehicle communication.

11. The method of claim 1, wherein the message packet comprises information indicative of an event.

12. A method, comprising:
determining, by a system comprising a processor, a resource used for transmitting a message packet, wherein the resource comprises a plurality of higher priority resource blocks, and wherein a time interval between different higher priority resource blocks of the plurality of higher priority resource blocks is smaller than another time interval between two lower priority resource blocks of a plurality of lower priority resource blocks; and
receiving, by the system, the message packet transmitted, at least in part, via a first higher priority resource block of the plurality of higher priority resource blocks and a first lower priority resource block of the plurality of lower priority resource blocks,
wherein the receiving the message packet comprises:
at least according to a first position of the first higher priority resource block for transmitting a higher priority part of the message packet, determining a second position of the first lower priority resource block for transmitting a lower priority part of the message packet,
wherein the determining the resource for transmitting the message packet comprises:
determining the plurality of higher priority resource blocks to transmit first priority parts of the message packet, and
determining the plurality of lower priority resource blocks to transmit secondary priority parts of the message packet in response to determining that the size of the message packet is larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer.

13. The method of claim 12, wherein the message packet comprises indicating information associated with the lower priority part and:
at least according to the first position of the first higher priority resource block, determining the second position of the first lower priority resource block, and
determining a third position of a second lower priority resource block for transmitting another lower priority part based on the indicating information.

14. The method of claim 13, wherein the indicating information comprises:
a second resource index corresponding to the first lower priority resource block that is determined as a function of a first resource index of the first higher priority resource block.

15. The method of claim 13, wherein the indicating information comprises a size of the lower priority part or a value of the time interval.

16. An apparatus, comprising:
a memory that stores executable modules; and
a processor, coupled to the memory, that executes or facilitates execution of the executable modules, the executable modules comprising:
a first determining module configured to determine a resource to be used for transmitting a message packet based on a size of the message packet, wherein the resource comprises at least one first-priority resource block, and wherein a time interval between respective first-priority resource blocks of the at least one first-priority resource block is smaller than another time interval between respective other-priority resource blocks; and
a first transmitting module configured to transmit at least a first-priority part of the message packet via the at least one first-priority resource block,
wherein the resource further comprises at least one second-priority resource block, and wherein the first transmitting module is further configured to transmit at least a second-priority part of the message packet via the at least one second-priority resource block based on the size of the message packet being determined to be larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer, and wherein the first determining module is further configured to determine a second position of the at least one second-priority resource block based on a first position of the at least one first-priority resource block.

17. The apparatus of claim 16, wherein the first determining module is further configured to determine the at least one first-priority resource block in response to the size of the message packet being determined to be not larger than the preset threshold value.

18. The apparatus of claim 16, wherein the first determining module is further configured to use the at least one first-priority resource block to transmit at least the first-priority part and indicating-information associated with at least the second-priority part, and wherein the indicating-information relates to index positions of blocks comprised in the resource.

19. An apparatus, comprising:
a memory that stores executable modules; and
a processor, coupled to the memory, that executes or facilitates execution of the executable modules, the executable modules comprising:
    a determining module configured to determine a resource used for transmitting a message, wherein the resource comprises priority resource blocks and other resource blocks, and wherein a time interval between a first and second priority resource block of the priority resource blocks is smaller than a different time interval between a first and second other resource block of the other resource blocks;
    a receiving module configured to receive the message transmitted by using at least the first priority resource block; and
    a transmitting module configured to transmit the message by using at least the first priority resource block,
wherein the transmitting module is configured to determine a second position within the resource for the first other resource block, based on a first position within the resource for the first priority resource block that is used to transmit a first priority part, for transmitting a second priority part,
wherein the determining module is further configured to:
    determine the plurality of higher priority resource blocks to transmit first priority parts of the message packet, and
    determine the plurality of lower priority resource blocks to transmit secondary priority parts of the message packet in response to determining that the size of the message packet is larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer.

20. The apparatus of claim 19, wherein the message to be transmitted by using the priority resource blocks comprises indicating information associated with the second priority part to be transmitted via the other resource blocks, and wherein the transmitting module is configured to determine the second position of the first other resource block for transmitting the second priority part based on the indicating information.

21. A computer readable storage device, comprising at least one executable instruction, which, in response to execution, causes a system comprising a processor to perform operations, comprising:
according to a size of a message packet to be transmitted, determining a resource used for transmitting the message packet, wherein the resource comprises at least one first-priority resource block, and a time interval between respective first-priority resource blocks of the at least one first-priority resource block is smaller than another time interval between respective lesser-priority resource blocks; and
transmitting at least a first priority part of the message packet by using the at least one first-priority resource block,
wherein the determining the resource used for the transmitting of the message packet comprises:
    determining the at least one first-priority resource block to transmit at least the first priority part, and
    determining at least one second-priority resource block to transmit at least a second priority part of the message packet in response to determining that the size of the message packet is larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer, and
    at least according to a first position of the at least one first-priority resource block for transmitting at least the first priority part within the resource, determining a second position of the at least one second-priority resource block for transmitting at least the second priority part within the resource.

22. The computer readable storage device of claim 21, wherein a size of the first priority part is not larger than another size of the second priority part.

23. The computer readable storage device of claim 21, wherein a lesser-priority resource block of the respective lesser-priority resource blocks belongs to a shared resource for a device-to-device communication between devices or belongs to a dedicated resource for a vehicle-to-vehicle communication.

24. A device comprising a processor and memory, wherein the memory stores executable instructions, the processor being connected with the memory via a communication bus, and when the device is operating, the processor executes or facilitates execution of the executable instructions stored by the memory to perform operations, comprising:
according to a size of a message packet to be transmitted, determining a resource used for transmitting the message packet, wherein the resource comprises at least one first-priority resource block, and a time interval between respective first-priority resource blocks of the at least one first-priority resource block is smaller than another time interval between respective lesser-priority resource blocks other than the at least one first priority resource block; and transmitting at least a first priority part of the message packet by using the at least one first-priority resource block, wherein the determining the resource used for the transmitting of the message packet comprises:
 determining the at least one first-priority resource block to transmit at least the first priority part,
 determining at least one second-priority resource block to transmit at least a second priority part of the message packet in response to determining that the size of the message packet is larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer, and
 at least according to a first position of the at least one first-priority resource block for transmitting at least the first priority part within the resource, determining a second position of the at least one second-priority resource block for transmitting at least the second priority part within the resource.

25. The device of claim 24, wherein a size of the first priority part is not larger than another size of the second priority part.

26. The device of claim 24, wherein a lesser-priority resource block of the respective lesser-priority resource blocks belongs to a shared resource for a device-to-device communication between devices or belongs to a dedicated resource for a vehicle-to-vehicle communication.

27. A computer readable storage device, comprising at least one executable instruction, which, in response to execution, causes a system comprising a processor to perform operations, comprising:
 determining a resource used for transmitting a message packet, wherein the resource at least comprises at least two first-priority resource blocks, and wherein a first time interval between the at least two first-priority resource blocks is smaller than a second time interval between other different-priority resource blocks other than the at least two first-priority resource blocks; and
 receiving the message packet transmitted by using, at least in part, at least one of the at least two first-priority resource blocks and at least one of the other different-priority resource blocks, the receiving the message packet comprising:
  determining a second position within the resource for the at least one other different-priority resource block, based on a first position within the resource for the at least one first-priority resource block that is used to transmit a first priority part, for transmitting a second priority part
 wherein the determining the resource for transmitting the message packet comprises:
  determining the plurality of higher priority resource blocks to transmit first priority parts of the message packet, and
  determining the plurality of lower priority resource blocks to transmit secondary priority parts of the message packet in response to determining that the size of the message packet is larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer.

28. The computer readable storage device of claim 27, wherein a size of the first priority part is not larger than another size of the second priority part.

29. The computer readable storage device of claim 27, wherein a different-priority resource block of the other different-priority resource blocks belongs to a shared resource for a device-to-device communication between devices or belongs to a dedicated resource for a vehicle-to-vehicle communication.

30. A device comprising a processor and a memory, wherein the memory stores executable instructions, the processor being connected with the memory via a communication bus, and when the device is operating, the processor executes or facilitates execution of the executable instructions stored by the memory to perform operations, comprising:
 determining a resource used for transmitting a message packet, wherein the resource at least comprises at least two first-priority resource blocks, and wherein a first time interval between the at least two first-priority resource blocks is smaller than a second time interval between other-priority resource blocks other than the at least two first-priority resource blocks; and
 receiving the message packet transmitted by using, at least in part, at least one of the at least two first-priority resource blocks and at least one of the other-priority resource blocks,
 wherein the receiving the message packet comprises:
  determining a second position within the resource for the at least one other-priority resource block, based on a first position within the resource for the at least one first-priority resource block that is used to transmit a first priority part, for transmitting a second priority part,
 wherein the determining the resource for transmitting the message packet comprises:
  determining the plurality of higher priority resource blocks to transmit first priority parts of the message packet, and
  determining the plurality of lower priority resource blocks to transmit secondary priority parts of the message packet in response to determining that the size of the message packet is larger than a preset threshold value, wherein the preset threshold value is set for dividing the message packet by resource blocks with different priorities, and is set to a value not smaller than a size of a core message packet of the message packet by taking a size of a data packet that is able to be carried via a unit resource for V2V message transmission defined for a physical layer.

31. The device of claim 30, wherein a size of the first priority part is not larger than another size of the second priority part.

32. The device of claim 30, wherein another-priority resource block of the other-priority resource blocks belongs to a shared resource for a device-to-device communication between devices or belongs to a dedicated resource for a vehicle-to-vehicle communication.

* * * * *